(12) United States Patent
Fujimoto et al.

(10) Patent No.: US 9,292,472 B2
(45) Date of Patent: Mar. 22, 2016

(54) DISPLAY APPARATUS FOR VEHICLES

(71) Applicant: HONDA MOTOR CO., LTD., Tokyo (JP)

(72) Inventors: Naotoshi Fujimoto, Utsunomiya (JP); Kentaro Kegai, Utsunomiya (JP); Naoki Shibata, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 263 days.

(21) Appl. No.: 13/902,147

(22) Filed: May 24, 2013

(65) Prior Publication Data

US 2013/0325279 A1 Dec. 5, 2013

(30) Foreign Application Priority Data

Jun. 4, 2012 (JP) ................................ 2012-126745

(51) Int. Cl.
| | | |
|---|---|---|
| G06F 7/70 | (2006.01) | |
| G06F 19/00 | (2011.01) | |
| G06G 7/00 | (2006.01) | |
| G06G 7/76 | (2006.01) | |
| B60B 39/00 | (2006.01) | |
| B60T 7/12 | (2006.01) | |
| G05D 1/00 | (2006.01) | |
| G06F 17/00 | (2006.01) | |
| B60K 35/00 | (2006.01) | |
| B60T 8/1755 | (2006.01) | |
| G01P 1/07 | (2006.01) | |
| G01P 1/12 | (2006.01) | |

(52) U.S. Cl.
CPC ................ *G06F 17/00* (2013.01); *B60K 35/00* (2013.01); *B60T 8/1755* (2013.01); *G01P 1/07* (2013.01); *G01P 1/127* (2013.01); *B60K 2350/2008* (2013.01); *B60T 2210/36* (2013.01)

(58) Field of Classification Search
None
See application file for complete search history.

(56) References Cited

U.S. PATENT DOCUMENTS

| | | | |
|---|---|---|---|
| 6,249,232 B1 * | 6/2001 | Tamura et al. | 340/902 |
| 2003/0176962 A1 * | 9/2003 | Traylor | 701/70 |
| 2005/0154510 A1 * | 7/2005 | Fujioka et al. | 701/29 |
| 2006/0149429 A1 * | 7/2006 | Aizawa | 701/1 |
| 2011/0037583 A1 * | 2/2011 | Fitzgerald et al. | 340/441 |

FOREIGN PATENT DOCUMENTS

| | | |
|---|---|---|
| DE | 10341846 | 3/2005 |
| JP | 11-281662 | 10/1999 |
| JP | 2005-265800 | 9/2005 |

OTHER PUBLICATIONS

European Search Report dated Oct. 16, 2013, 6 pages.

* cited by examiner

*Primary Examiner* — Yonel Beaulieu
*Assistant Examiner* — Lail Kleinman
(74) *Attorney, Agent, or Firm* — Rankin, Hill & Clark LLP

(57) ABSTRACT

A vehicular display apparatus on a vehicle includes a display device which displays a magnitude of an acceleration which is being detected by an acceleration sensor on a display unit, and also displays a magnitude of an acceleration detected by the acceleration sensor when an ESC controller generated a braking force on road wheels on the display unit.

35 Claims, 11 Drawing Sheets

FIG. 5
| PRESENT G POINT (LATEST G POINT) |  —206 | | |
|---|---|---|---|
| CURRENT HISTORY Ge (OTHER THAN LATEST G POINT) | <br>(TRANSMISSIVE) | <br>(CHANGED SIZE) | <br>(CHANGED COLOR) |

FIG. 6

| PAST OPERATING G POINT (LATEST POINT) | ⊗ —306 | ⊠ —317 |
|---|---|---|
| OTHER THAN PAST OPERATING G POINT (OTHER THAN LATEST POINT) | ⊘ —307, 308 (TRANSMISSIVE) | ☐ —314~316 (CHANGED SHAPE, SIZE, COLOR) |

DISPLAY APPARATUS FOR VEHICLES

CROSS-REFERENCE TO RELATED APPLICATION

This application is based upon and claims the benefit of priority from Japanese Patent Application No. 2012-126745 filed on Jun. 4, 2012, the contents of which are incorporated herein by reference.

BACKGROUND OF THE INVENTION

1. Field of the Invention

The present invention relates to a vehicular display apparatus for displaying an acceleration generated on a vehicle, i.e., an acceleration applied to a vehicle, on a display unit.

2. Description of the Related Art

Heretofore, there have been proposed vehicular display apparatus for displaying an acceleration generated on a vehicle on a display unit.

Japanese Laid-Open Patent Publication No. 2005-265800 (hereinafter referred to as "JP2005-265800A") discloses a vehicular display apparatus which displays an acceleration generated in two directions, i.e., longitudinal and transverse directions, of a vehicle and detected by an acceleration sensor, together with their directions, on a display unit (FIG. 4 of JP2005-265800A). The disclosed display apparatus calls driver's attention with a buzzer sound if the magnitude of the detected acceleration exceeds a threshold value ([0031] of JP2005-265800A).

Japanese Laid-Open Patent Publication No. 11-281662 (hereinafter referred to as "JP1999-281662A") discloses a vehicular display apparatus which displays the magnitude of an acceleration detected by an acceleration sensor as a bar graph on a display unit, and, if the magnitude of the detected acceleration is equal to or greater than a threshold value (reference value), displays the magnitude in a red display area of the bar graph, displays a warning message, or outputs a speech message to call the driver's attention ([0015] of JP1999-281662A).

SUMMARY OF THE INVENTION

However, even though the user such as the driver of the vehicle may be alerted by sounds or displayed information, the user is unable to understand what problem has happened when the magnitude of the acceleration generated on the vehicle reaches or exceeds the threshold value. Therefore, the vehicular display apparatus according to the related art still have much room to improve.

The vehicular display apparatus disclosed in JP2005-265800A and JP1999-281662A have a fixed threshold value for outputting a warning to call driver's attention if the magnitude of a detected acceleration reaches or exceeds the threshold value. However, the inventors of the present invention have found that the fixed threshold value may not be suitable depending on the condition of the road on which the vehicle travels, such as the slippery nature of the road, or the condition of the vehicle at the time the vehicle makes a turn.

The inventors of the present invention have noticed that recent vehicles incorporate a skid prevention controller for detecting the skidding of the road wheels on the road and applying a braking force to the road wheels to prevent the skidding of the road wheels.

The skid prevention controller may be a lateral skid prevention device {hereinafter referred to as "ESC (Electronic Stability Control) device} for preventing the vehicle from skidding laterally.

Recent ESC devices have, in addition to an ESC function to prevent the vehicle from skidding laterally as when the vehicle makes a turn, an ABS (Antilock Braking System) control function to prevent the road wheels from being locked when the vehicle is abruptly braked or is braked on a slippery road, and a TCS (Traction Control System) control function to prevent the drive road wheels from spinning when the vehicle starts to move or accelerates for thereby making the vehicle stable when the vehicle starts to move and also making the vehicle excellently acceleratable when the vehicle accelerates.

An ESC device operates as follows: When the ESC device judges that the behavior of a vehicle comes to a critical state due to the slippage of road wheels or the lateral skidding of the vehicle, based on a detected value representing the vehicle behavior, the ESC device intermittently actuates respective brake units of the four road wheels to generate and apply braking forces to the road wheels to stabilize the vehicle behavior based on the ESC function, the ABS control function, and the TCS control function.

It is an object of the present invention to provide a vehicular display apparatus for use on a vehicle incorporating the skid prevention control technology about recent ESC devices with an ESC function, an ABS function, and a TCS function, the vehicular display apparatus being capable of letting the user know when the behavior of the vehicle comes to a critical state and/or of making it possible for the user to understand or predict, to a certain degree, the possibility that a skid prevention controller on the vehicle will operate.

According to the present invention, there is provided a vehicular display apparatus for displaying an acceleration generated on a vehicle which includes a skid prevention controller for detecting skidding of a road wheel on a road and generating a braking force on the road wheel to prevent the road wheel from skidding, comprising an acceleration sensor for detecting the acceleration generated on the vehicle, and a display device for displaying a magnitude of the acceleration which is being detected by the acceleration sensor, wherein the display device displays the magnitude of the acceleration which is being detected by the acceleration sensor, and displays a magnitude of an acceleration detected by the acceleration sensor when the skid prevention controller generated the braking force on the road wheel.

The display device displays the magnitude of the acceleration which is being detected by the acceleration sensor, and displays the magnitude of an acceleration detected by the acceleration sensor when the skid prevention controller generated the braking force on the road wheel. Therefore, the user such as the driver of the vehicle is able to understand the magnitude of the acceleration generated when the skid prevention controller was operated, in a feedback fashion. In other words, the user is able to know that a critical state of the vehicle behavior has happened. Therefore, since the user can compare the magnitude of the acceleration that is presently detected by the acceleration sensor (the magnitude of the acceleration generated while the vehicle is presently traveling), and the magnitude of the acceleration that was generated when the skid prevention controller applied the braking forces to the road wheel with each other, the user can understand or predict, to a certain degree, the possibility that the skid prevention controller will be operated. Stated otherwise, though the critical acceleration of the vehicle changes variously due to friction between the road and the road wheel, the skid prevention controller lets the user know the acceleration generated when the skid prevention controller applied the braking force to the road wheel, i.e., the skid prevention controller was operated, by way of feedback, thereby allowing the user to understand the critical performance of the vehicle.

Preferably, the display device displays the magnitude of the acceleration which is being detected by the acceleration sensor on a prescribed scale, and displays the magnitude of the acceleration detected by the acceleration sensor when the skid prevention controller generated the braking force on the road wheel on the prescribed scale.

Inasmuch as the magnitude of the acceleration generated when the skid prevention controller was operated in the past and the magnitude of the present acceleration are displayed together on the same scale, the user can understand or predict, to a certain degree, how large an acceleration may be to trigger the skid prevention controller.

The vehicular display apparatus should preferably further comprise a storage unit for storing the magnitude of the acceleration detected by the acceleration sensor when the skid prevention controller generated the braking force on the road wheel, and the display device should preferably display a prescribed number of data of the magnitude of the acceleration stored in the storage unit on the prescribed scale.

Although there are various conditions (boundary lines) under which the magnitude of an acceleration takes a prescribed value depending on the behavior of the vehicle, the driving maneuver of the user, the state of the road, etc., the user can understand boundary lines along which the skid prevention controller is to be operated by understanding the magnitudes of accelerations generated when the skid prevention controller was operated in the past. For example, the user is able to understand that the magnitude of an acceleration generated on the vehicle when the skid prevention controller is operated is different depending on the state of the road, e.g., how slippery the road is, and the state of the vehicle, e.g., whether the vehicle is making a turn or not. As a result, it is possible for the user to feel and realize the critical performance and critical behavior of the vehicle at the time the skid prevention controller is operated, and hence to understand or predict, to a certain degree, the possibility that the skid prevention controller will be operated.

Preferably, the display device displays the magnitude and a direction of the acceleration which are being detected by the acceleration sensor on the prescribed scale, and displays the magnitude and a direction of the acceleration detected by the acceleration sensor when the skid prevention controller generated the braking force on the road wheel on the prescribed scale.

Inasmuch the directions of the accelerations in addition to the magnitudes thereof are displayed, the user can understand how large the magnitude of an acceleration may be and what steering angle the vehicle may be turned at to trigger the skid prevention controller.

According to the present invention, there is also provided a vehicular display apparatus for displaying an acceleration generated on a vehicle which includes a skid prevention controller for detecting skidding of a road wheel on a road and generating a braking force on the road wheel to prevent the road wheel from skidding, comprising an acceleration sensor for detecting an acceleration generated on the vehicle, a display device for displaying the magnitude of the acceleration which is being detected by the acceleration sensor, and a storage unit for storing the magnitude of the acceleration detected by the acceleration sensor when the skid prevention controller generated the braking force on the road wheel, wherein the display unit displays the magnitude of the acceleration which is being detected by the acceleration sensor, and displays the magnitude of an acceleration to be detected by the acceleration sensor when the skid prevention controller is to generate the braking force on the road wheel, based on the magnitude of the acceleration stored in the storage unit.

As described above, although there are various boundary lines under which the magnitude of an acceleration takes a prescribed value depending on the behavior of the vehicle, the driving maneuver of the user, the state of the road, etc., since the magnitude of an acceleration to be detected by the acceleration sensor when the skid prevention controller is to generate the braking force on the road wheel is displayed based on the magnitude of the acceleration generated when the skid prevention controller generated the braking force on the road wheel in the past, i.e., the magnitude of the acceleration generated when the skid prevention controller was operated, the user can predict, to a certain degree, operation of the skid prevention controller, and understand the critical performance and critical behavior of the vehicle.

Preferably, each of the own vehicle and another vehicle includes the skid prevention controller, the acceleration sensor, the display device, and the storage unit, and the own vehicle includes an other-vehicle information acquirer for acquiring a magnitude of an acceleration detected by the acceleration sensor of the other vehicle and stored in the storage unit of the other vehicle when the skid prevention controller of the other vehicle generated a braking force on a road wheel of the other vehicle, and the own vehicle displays the magnitude of the acceleration acquired by the other-vehicle information acquirer on the display device.

Since the magnitude of the acceleration based on an operation history of the skid prevention controller of the other vehicle is displayed on the display device of the own vehicle, operation of the skid prevention controller of the own vehicle can be predicted with greater accuracy.

The storage unit may be present in the own vehicle or an external server or both.

According to the present invention, the display device displays the magnitude of the acceleration which is being detected by the acceleration sensor, and displays the magnitude of an acceleration detected by the acceleration sensor when the skid prevention controller generated the braking force on the road wheel. Therefore, the user such as the driver of the vehicle is able to understand the magnitude of the acceleration generated when the skid prevention controller was operated, in a feedback fashion. The user is able to understand when the vehicle behavior reached a critical state (critical performance, critical behavior), and can understand and predict, to a certain degree, the possibility of operation of the skid prevention controller of the vehicle.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a diagram showing by way of example the manner in which a present G point and a current history are expressed;

FIG. 6 is a diagram showing by way of example the manner in which operating points are highlighted when an ESC device was operated;

DESCRIPTION OF THE PREFERRED EMBODIMENTS

Preferred exemplary embodiments of the present invention will be described below with reference to the drawings.

Embodiments

Figure 1:
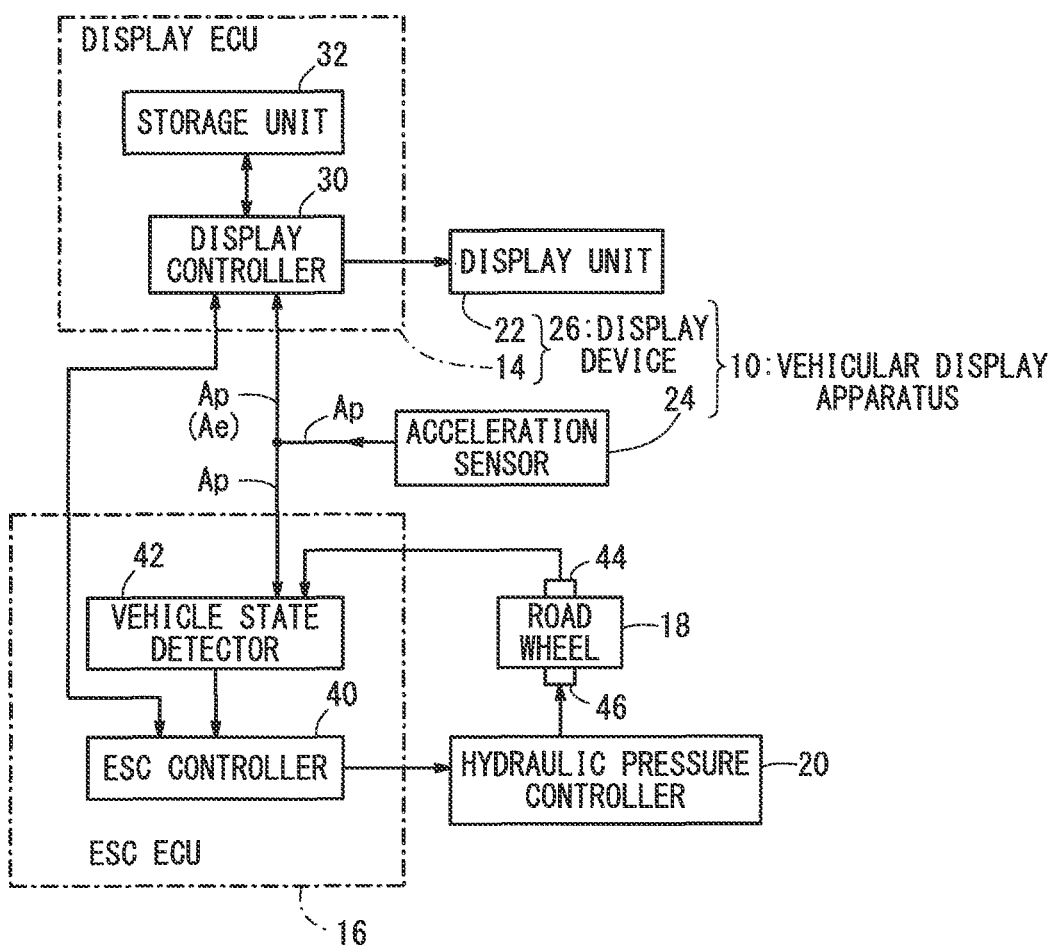
FIG. 1 is a block diagram of a vehicle incorporating a vehicular display apparatus according to an exemplary embodiment of the present invention.

FIG. 1 shows in block form a vehicle 12 incorporating a vehicular display apparatus 10 according to an exemplary embodiment of the present invention.

As shown in FIG. 1, the vehicle 12 basically includes a display ECU (Electronic Control Unit) 14, a display unit 22, an ESC ECU (ESC's ECU) 16 as a skid prevention controller (skid prevention unit), four road wheels 18, a hydraulic pressure controller 20, and an acceleration sensor 24.

The display ECU 14 and the display unit 22 jointly make up a display device (display means) 26, and the display device 26 and the acceleration sensor 24 jointly make up the vehicular display apparatus 10. In the present embodiment, a headup display (HUD) for displaying information on a front windshield is used as the display unit 22. However, a display panel of a navigation system or a multiple information display unit on an instrument panel may be used as the display unit 22.

The display ECU 14 and the ESC ECU 16 function as various function units (various function means) which are realized when a CPU (Central Processing Unit) executes programs stored in a memory (storage unit). In the present embodiment, the display ECU 14 functions as a display controller (display control unit) 30 and a storage unit (storage means) 32, and the ESC ECU 16 functions as an ESC controller (ESC control unit) 40 and a vehicle state detector (vehicle state detecting unit) 42.

The storage unit 32 includes a nonvolatile rewritable memory (storage unit) such as a flash memory or the like. According to "still another exemplary embodiment" to be described later, however, the storage unit 32 may or may not include nonvolatile rewritable storage unit. The display unit 22 or the display controller 30 incorporates a display memory or the like.

The acceleration sensor 24, which comprises a biaxial acceleration sensor, detects the magnitude Ap of an acceleration that is generated on the vehicle 12 in longitudinal and transverse directions thereof, and outputs the detected magnitude Ap to the vehicle state detector 42 and the display controller 30. The acceleration sensor 24 is capable of detecting the magnitude Ap of the acceleration that is generated on the vehicle 12 and also the direction of the acceleration, i.e., the direction of a vector sum which is produced by adding the vector of the acceleration in the longitudinal directions and the vector of the acceleration in the transverse directions.

The vehicle state detector 42 detects road wheel speeds from road wheel speed sensors 44 which detect the road wheel speeds of the four road wheels 18, in addition to the magnitude Ap and direction of the acceleration supplied from the acceleration sensor 24. The vehicle state detector 42 also detects a yaw rate from a yaw rate sensor, not shown, a steering angle from a steering angle sensor, not shown, and an accelerator opening from an accelerator opening sensor, not shown, or the like.

The vehicle state detector 42 supplies these detected values of the vehicle state to the ESC controller 40 which serves as a skid prevention controller.

When the ESC controller 40 decides that the behavior of the vehicle 12 comes to a critical state due to the slippage of the road wheels 18 or the lateral skidding of the vehicle 12, based on the detected values of the vehicle state, in a known fashion, the ESC controller 40 controls the hydraulic pressure controller 20 to intermittently actuate respective brake actuators 46 of the four road wheels 18 to perform (operate) an ESC function in a narrow sense {a lateral skid control function as an ESC function in a narrow sense is referred to as a VSA (Vehicle Stability Assistance) control function} and an ESC function in a wide sense which includes an ABS control function and a TCS control function. When the ESC function in the wide sense is operated, braking forces are applied to the road wheels 18 to stabilize the behavior of the vehicle 12.

For an easier understanding of the present invention, the ESC function will hereinafter cover the VSA control function, the ABS control function, and the TCS control function, and the lateral skid control function as the ESC function in the narrow sense will hereinafter mean the VSA control function.

The magnitude of an acceleration detected when the ESC ECU 16 (ESC controller 40) performs the ESC function to apply braking forces to the road wheels 18, which will be referred to as "magnitude Ae" or "acceleration Ae", is read from the acceleration sensor 24 into the display controller 30, and stored as chronological data, i.e., a history of data, into the storage unit 32. The magnitude of an acceleration that is presently generated on the vehicle 12, which will be referred to as "magnitude Ap" or "acceleration Ap", is also detected and read at each sampling time into the display controller 30.

The display unit 22 displays the magnitude Ap (present G point) of the acceleration that is presently detected by the acceleration sensor 24 under the control of the display controller 30, and also displays the magnitude Ae (past operating G point) of the acceleration generated when the ESC ECU 16 (ESC controller 40) applies braking forces to the road wheels 18. The value 1 G represents 9.8 $[m/s^2]$.

Various display modes for displaying the present G point (acceleration Ap) and the past operating G point (acceleration Ae) on the display unit 22 of the display device 26 will be described below.

First Inventive Example

Figure 2:
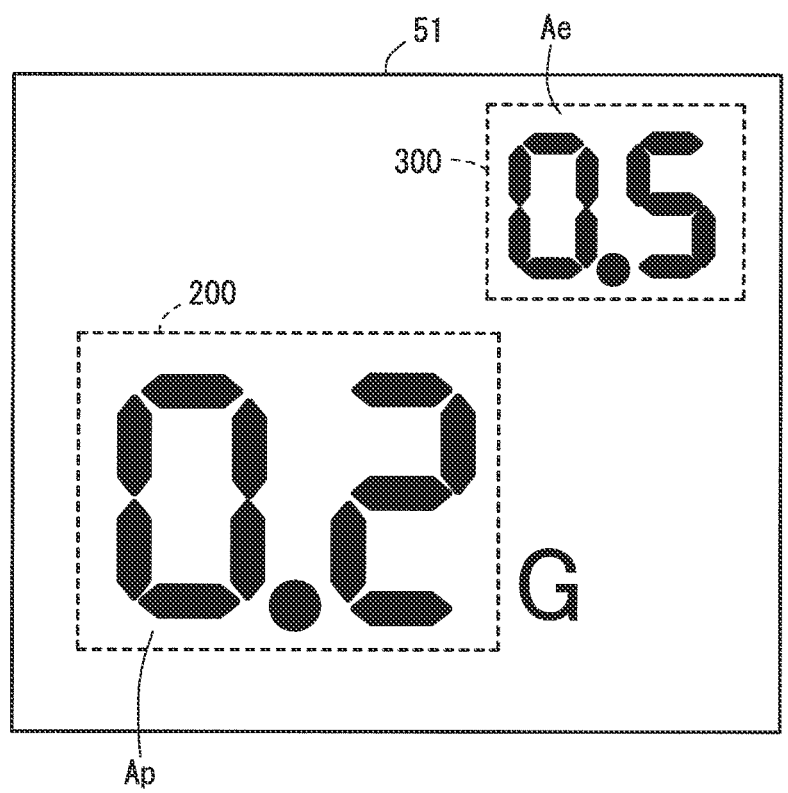
FIG. 2 is a view showing a display screen according to a first inventive example (first display mode)

FIG. 2 is a view showing a display screen (image) 51 displayed on the display unit 22 according to a first inventive example (first display mode). As shown in FIG. 2, the display screen 51 displays, in a lower left area thereof, the magnitude Ap (Ap=0.2 [G] in FIG. 2) of the acceleration as a present G point 200, and also displays, in an upper right area thereof, the magnitude Ae (Ae=0.5 [G] in FIG. 2) of the acceleration generated when the ESC controller 40 was operated in the past, as a past operating G point 300. The magnitude Ae of the acceleration as the past operating G point 300 has been stored in the storage unit 32.

Since the magnitude Ap (present G point 200) of the present acceleration detected by the acceleration sensor 24 and the magnitude Ae (past operating G point 300) of the acceleration detected by the acceleration sensor 24 at the time the ESC controller 40 was operated to apply braking forces to the road wheels 18 are displayed on the display screen 51, the user of the vehicular display apparatus 10 can understand or predict, to a certain degree, the possibility that the ESC controller 40 will be operated, from the displayed values. Specifically, the user can understand that the ESC controller 40 may be operated if the magnitude Ap of the present acceleration approaches the acceleration Ae represented by the past operating G point 300.

In FIG. 2, the magnitude Ap of the present acceleration as the present G point 200 is updated in each period of 100 [ms]. Specifically, the magnitude of an acceleration is detected in each period of 10 [ms], 10 acceleration data are averaged in each period of 100 [ms], and the average value is displayed as the magnitude Ap of the present acceleration. Normally, the magnitude Ap of the present acceleration that is displayed as the present G point 200 may possibly vary from time to time. However, the magnitude Ae of the acceleration displayed as the past operating G point does not vary unless the ESC controller 40 is operated. The interval at which the acceleration sensor 24 detects accelerations, and the parameter of the average value may be changed appropriately.

The configuration, operation, and advantages of the first inventive example described above with reference to FIG. 2 will be described in greater detail below. The display controller 30 of the display device 26 displays the magnitude Ap of the acceleration that is detected by the acceleration sensor 24, as the present G point 200, and also displays the magnitude Ae of the acceleration that is detected by the acceleration sensor 24 at the time the ESC controller 40 as the skid prevention controller controls the hydraulic pressure controller 20 and the brake actuators 46 to apply braking forces to the road wheels 18, as the past operating G point 300. Therefore, the user, such as the driver of the vehicle 12, is able to understand the magnitude Ae of the acceleration generated when the ESC controller 40 is operated, in a feedback fashion. In other words, the user is able to know that a critical state of the vehicle behavior happened in the past in terms of the magnitude Ae=0.5 [G] of the acceleration. Therefore, since the user can compare the magnitude Ap of the acceleration that is presently detected by the acceleration sensor 24 (the magnitude of the acceleration generated while the vehicle 12 is presently traveling is 0.2 [G] in FIG. 2), and the magnitude Ae of the acceleration that was generated when the ESC controller 40 applied the braking forces to the road wheels 18 (the magnitude of the acceleration generated in the past is 0.5 [G] in FIG. 2), with each other, the user can understand or predict, to a certain degree, the possibility that the ESC controller 40 will be operated.

Stated otherwise, the display device 26 displays the magnitude Ae of the acceleration, which was generated when the ESC controller 40 was operated in the past, and which is the magnitude of the acceleration to be detected by the acceleration sensor 24 when the ESC controller 40 is to apply braking forces to the road wheels 18 next time. Consequently, the user is able to predict, to a certain degree, the operation of the ESC controller 40, and hence to understand the critical performance and critical behavior of the vehicle 12.

Second Inventive Example

Figure 3:
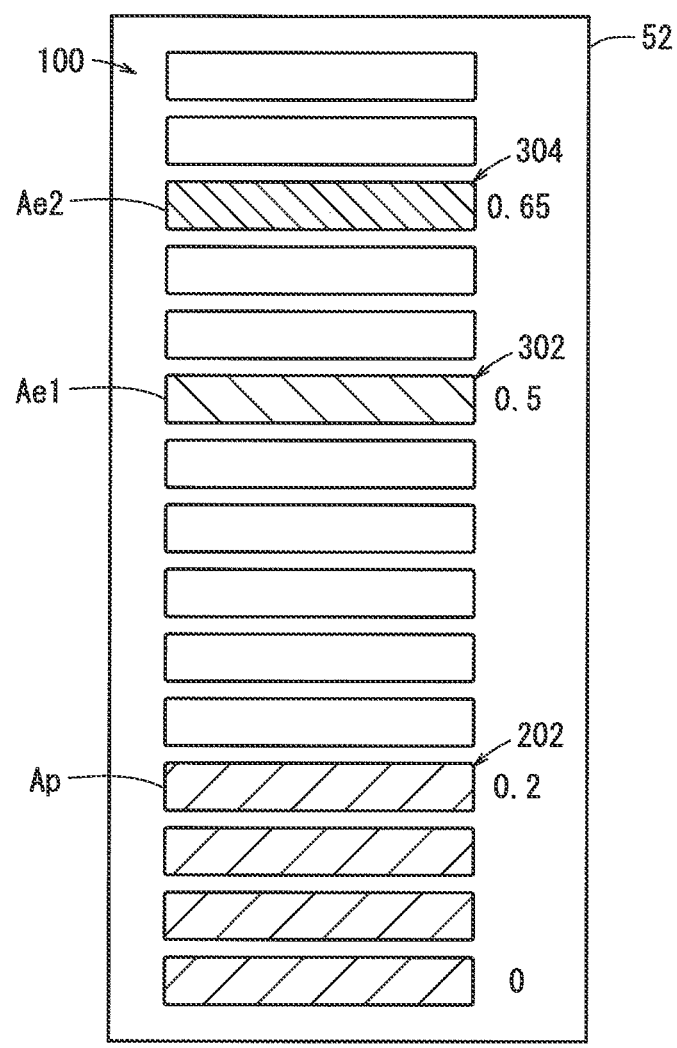
FIG. 3 is a view showing a display screen according to a second inventive example (second display mode)

FIG. 3 is a view showing a display screen (image) 52 displayed on the display unit 22 according to a second inventive example (second display mode).

As shown in FIG. 3, the display screen 52 displays a scale 100 as a prescribed scale made up of a vertical succession of rectangular frames per 0.05 [G].

The scale 100 displays thereon the magnitude Ap of the present acceleration as a present G point 202 (Ap=0.2 [G] in FIG. 3) in the form of lighted frames, shown hatched, from the lowermost frame up to the fourth frame, and also displays the magnitudes Ae of accelerations generated at the time the ESC controller 40 was operated in the past, e.g., the magnitude Ae of an acceleration generated at the last time (Ae=Ae2=0.65 [G]), and the magnitude Ae of an acceleration generated at the last but one time (Ae=Ae1=0.5 [G]), as past operating G points 304, 302, respectively.

According to the second inventive example, since the magnitudes Ae1, Ae2 of the accelerations generated when the ESC controller 40 was operated in the past and the magnitude Ap of the present acceleration are simultaneously displayed as the past operating G points 302, 304 and the present G point 202 on the same scale 100, the user is able to instantaneously understand or predict, to a certain degree, and also to learn, how large the magnitudes Ap, Ae1, Ae2 of the accelerations may be to trigger the ESC controller 40.

Third Inventive Example

Figure 4:
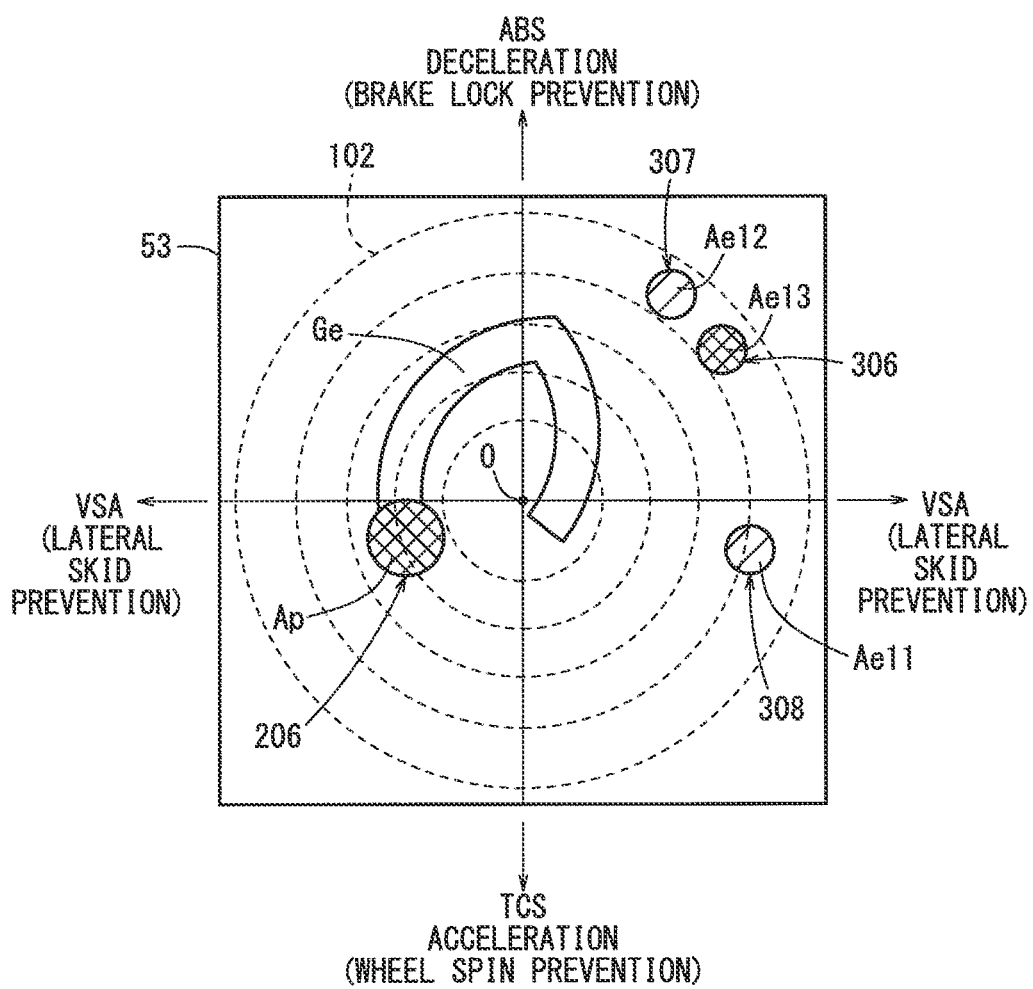
FIG. 4 is a view showing a display screen according to a third inventive example (third display mode)

FIG. 4 is a view showing a display screen (image) 53 according to a third inventive example (third display mode). As shown in FIG. 4, the display screen 53 displays a scale 102 as a prescribed scale made up of concentric circles indicated by the broken lines.

The screen 53 includes a vertical axis extending above an origin O along the longitudinal directions of the vehicle 12, the vertical axis representing a deceleration axis and being related to the ABS control function to prevent the road wheels 18 from being locked. The screen 53 includes another vertical axis extending below the origin O along the longitudinal directions of the vehicle 12, the vertical axis representing an acceleration axis and being related to the TCS control function to prevent the road wheels 18 from spinning. The screen 53 also has horizontal axes extending to the right and left of the origin O along the transverse directions of the vehicle 12, the horizontal axes being related to the VSA control function to prevent the vehicle 12 from skidding laterally for the prevention of understeer and oversteer.

The scale 102 displays thereon the acceleration Ap as a present G point 206, and also a succession of magnitudes Ap of accelerations from the present time back to several seconds in the past, as a current history Ge. Specifically, the average of ten magnitudes Ap of latest (present) accelerations obtained in respective periods of 10 [ms] is displayed as the magnitude Ap of one acceleration (present G point 206), and a change (trajectory) of the present G point 206 during a past period of 3000 [ms] is displayed as a current history Ge contiguous to the present G point 206 on the screen 53.

The same scale 102 also displays thereon magnitudes Ae11, Ae12, Ae13 and directions of accelerations generated when the ESC controller 40 was operated in the past, as past operating G points 308, 307, 306. Specifically, the scale 102 displays the present G point 206 (1 point) as the magnitude Ap of the acceleration, the current history Ge (29 points) contiguous to the present G point 206, and the past operating G points 306, 307, 308 (3 points) produced when the ESC controller 40 was operated in the past, as a total of 33 G points displayed on the screen 53. The number of G points displayed on the screen 53 is by way of example only, and may be changed as desired in view of the size of the display unit 22 and the ease with which the screen 53 is viewed.

According to the third inventive example, although there are various conditions (boundary lines) under which the magnitude Ap of an acceleration takes a prescribed value depending on the behavior of the vehicle 12, the driving maneuver of the user, the state of the road, etc., the user can understand boundary lines along which the ESC controller 40 is to be operated by understanding the magnitudes Ae11, Ae12, Ae13 of the accelerations generated when the ESC controller 40 was operated, from the past operating G points 308, 307, 306. For example, the user is able to understand that the magnitude Ap (Ae) of an acceleration generated on the vehicle 12 when the ESC controller 40 is operated is different depending on the state of the road, e.g., how slippery the road is, and the state of the vehicle 12, e.g., whether the vehicle 12 is making a turn or not. As a result, it is possible for the user to feel and realize the critical performance and critical behavior of the vehicle 12 at the time the ESC controller 40 is operated, and hence to understand or predict, to a certain degree, the possibility that the ESC controller 40 will be operated, i.e., the magnitude Ap of an acceleration.

Furthermore, inasmuch as the screen 53 displays the directions of the accelerations in addition to the magnitudes Ap, Ae thereof, the user can understand how large the magnitude Ap of an acceleration may be and what steering angle the vehicle 12 may be turned at to trigger the ESC controller 40, or stated otherwise, the user can understand the critical behavior of the vehicle 12.

FIG. 5 is a diagram showing by way of example the manner in which the magnitude Ap of the acceleration (present G point) as the present G point 206 and the current history Ge in the image 53 shown in FIG. 4 are expressed. FIG. 6 is a diagram showing by way of example the manner in which the magnitudes Ae of the past operating G points 306, 307, 308 are expressed when the ESC controller 40 was operated in the past in the image 53 shown in FIG. 4.

Figure 7:
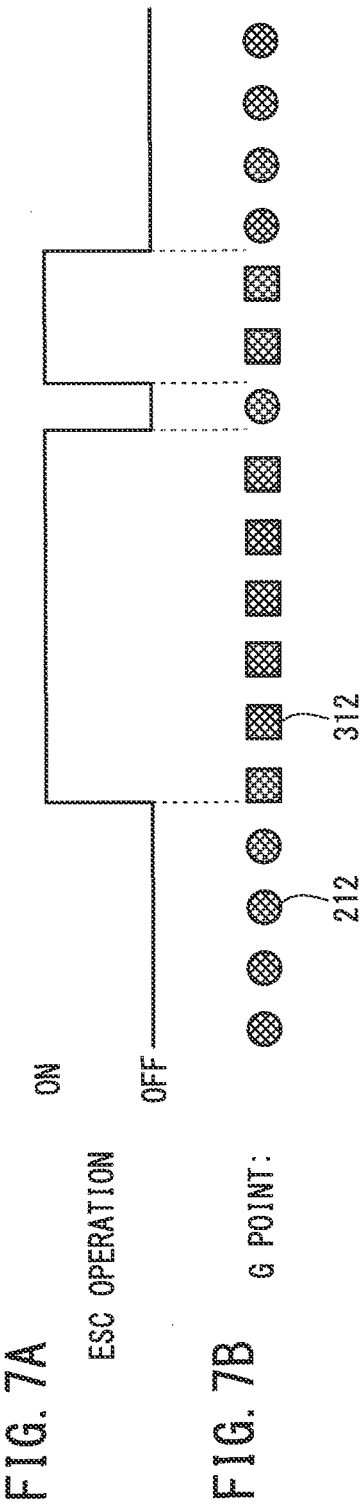
FIG. 7A is a timing chart of an operation sequence of the ESC device as it is switched into and out of operation.
FIG. 7B is a diagram showing by way of example the manner in which G points are displayed when the ESC device is switched into and out of operation.

FIG. 7A is a timing chart of an example of an operation sequence of the ESC controller 40 as it is operated (ON) and not operated (OFF). FIG. 7B is a diagram showing by way of example the manner in which the magnitude Ap of the acceleration (present G point 212) is expressed along the sequence, and the manner in which the magnitude Ae of the acceleration (past operating G point 312) when the ESC controller 40 was operated is expressed.

Figure 8:
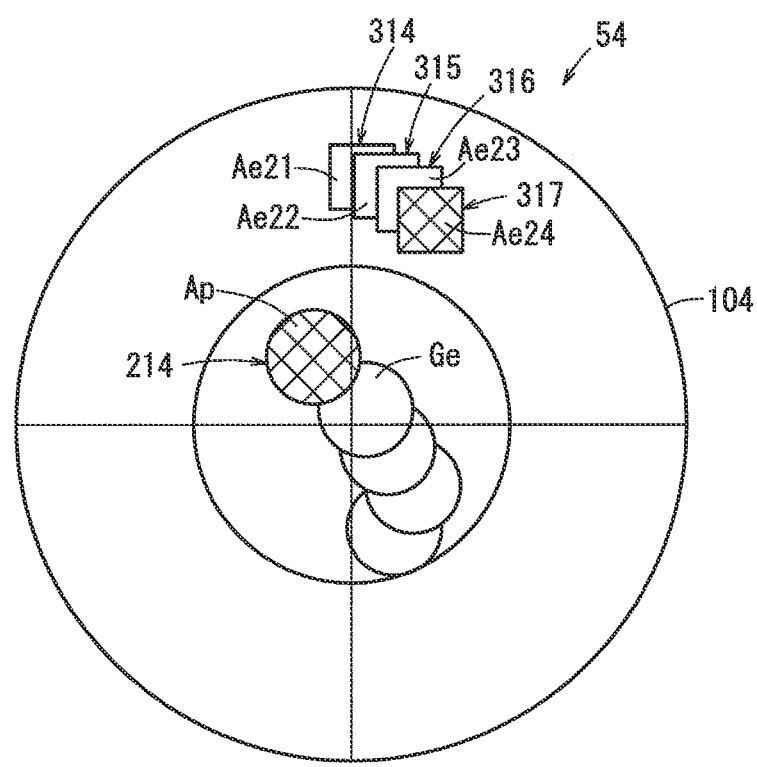
FIG. 8 is a view showing a display screen according to a modification of the third inventive example (third display mode)

FIG. 8 is a view showing a display screen 54 according to a modification of the third inventive example shown in FIG. 4, the display screen 54 displaying a present G point 214 which represents the magnitude Ap of an acceleration and a current history Ge, and past operating G points 314, 315, 316, 317 (accelerations Ae21, Ae22, Ae23, Ae24) of the ESC controller 40.

As shown in FIG. 5, the present G point (latest G point) 206 representing the magnitude Ap of the latest acceleration detected by the acceleration sensor 24 is displayed. In order to illustrate the present G point (the magnitude Ap of the acceleration) 206 as it moves along a trajectory, the current history Ge other than the present G point 206, i.e., other than the latest G point, is displayed in a transmissive pattern, a changed size, or a changed color (see FIGS. 4 and 8).

As shown in FIG. 6, among the past operating G points 306, 307, 308 (314, 315, 316, 317) of the ESC controller 40, the latest past operating G point (latest point) 306 (317) is displayed as a most visible point, and the past operating G points 307, 308 (314, 315, 316) other than the latest past operating G point (latest point) 306 (317) is displayed in a transmissive pattern, a changed size, a changed shape, or a changed color {see FIG. 4 (8)}.

According to the example shown in FIG. 5, the current history Ge other than the present G point 206 as the latest G point is displayed differently from the present G point 206 in one of the display modes (the transmissive pattern, the changed size, and the changed color) shown in FIG. 5.

According to the example shown in FIG. 6, the past operating G points 307, 308 (314, 315, 316) other than the latest past operating G point (latest point) 306 (317) is displayed differently from the latest past operating G point (latest point) 306 (317) in one of the display modes (the transmissive pattern, the changed size, the changed shape, and the changed color) shown in FIG. 6.

The display screen 54 shown in FIG. 8 displays a scale 104 which displays thereon the accelerations Ae21, Ae22, Ae23, Ae24 generated when the ESC controller 40 was operated in the past and directions thereof, as the past operating G points 314, 315, 316, 317, respectively. The past operating G points 314, 315, 316, 317 are controlled by the display controller 30 such that they will not disappear after elapse of 3 seconds during which the current history Ge is displayed. When the user turns off the ignition switch, not shown, of the vehicle 12, or changes the screen of the headup display to another screen, the past operating G points 314, 315, 316, 317 may be reset by the display controller 30.

The past operating G points 314, 315, 316, 317 may not be reset, but may be updated in display on a first-in first-out basis, i.e., they may be deleted successively from the oldest past operating G point 314, when the number of operating G points to be displayed exceeds the maximum number of operating G points that can be displayed (maximum number of operating G points that can be stored) which depends upon the display size of the display unit 22.

Another Exemplary Embodiment

Fourth Inventive Example

Figure 9:
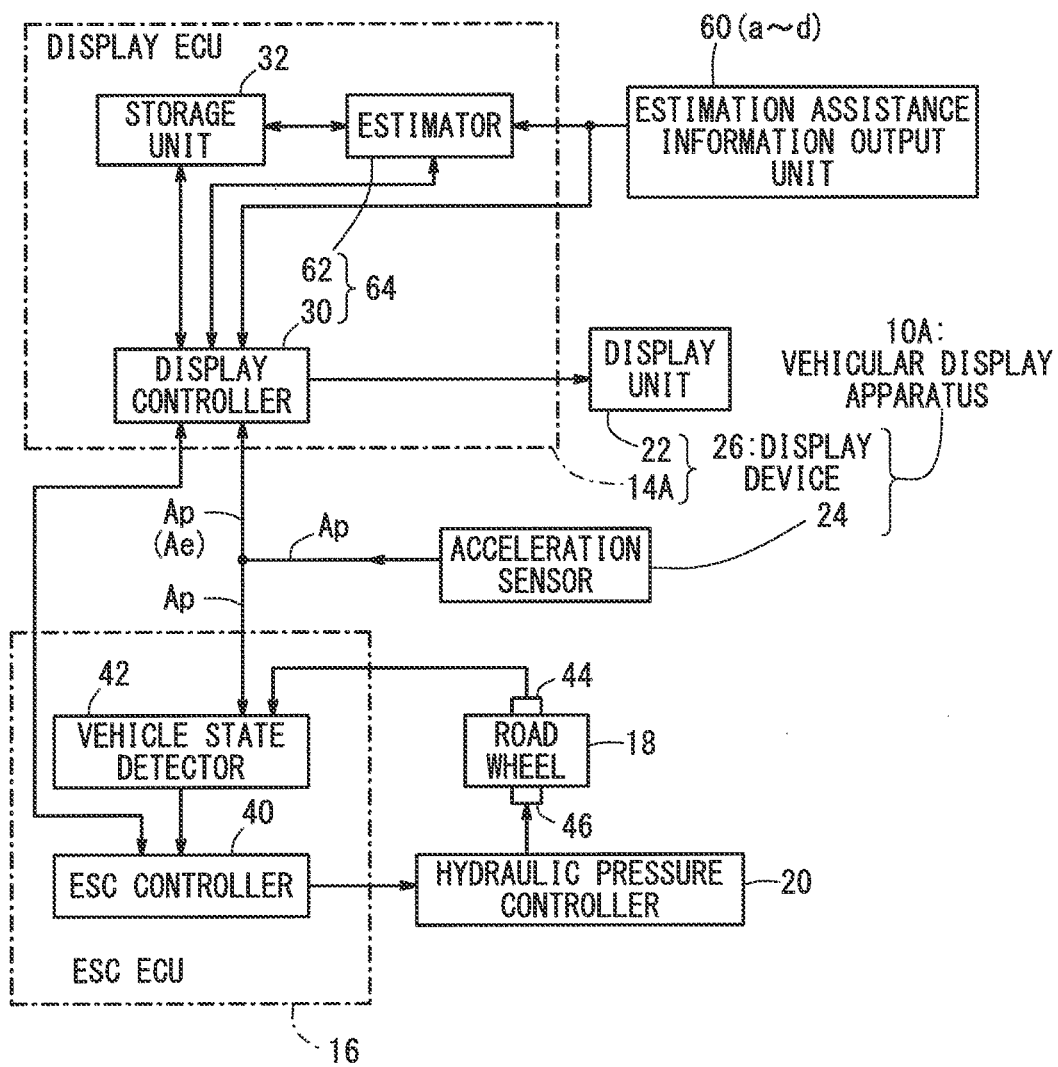
FIG. 9 is a block diagram of a vehicle incorporating a vehicular display apparatus according to another exemplary embodiment of the present invention.

FIG. 9 is a block diagram of a vehicle 12 incorporating a vehicular display apparatus 10A according to another exemplary embodiment of the present invention.

Figure 10:
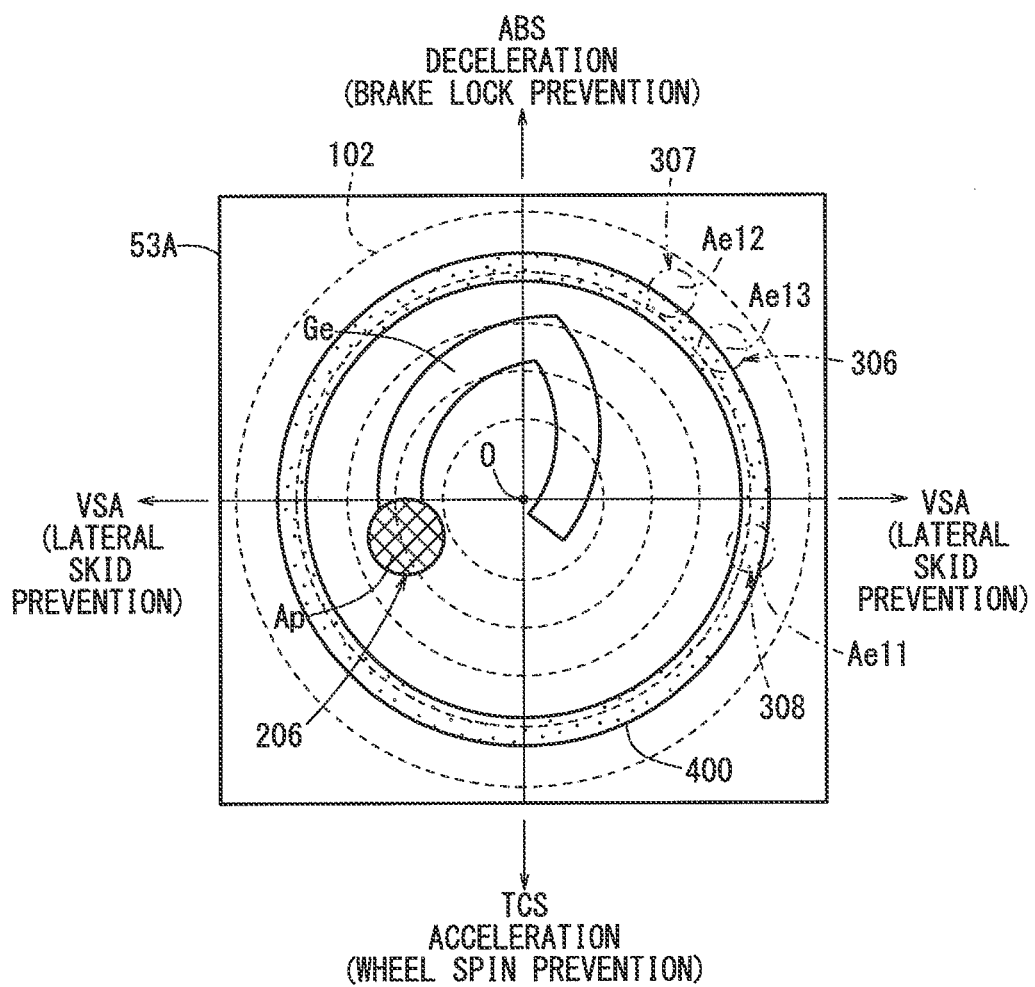
FIG. 10 is a view showing a display screen according to a fourth inventive example (fourth display mode)

FIG. 10 is a view showing a display screen according to a fourth inventive example (fourth display mode). Those parts shown in FIGS. 9 and 10 which are identical or correspond to those shown in FIGS. 1 and 4 are denoted by identical or corresponding reference characters with a suffix "A", and will not be described in detail below.

As shown in FIG. 9, the vehicular display apparatus 10A has a display ECU 14A further including an estimator (estimating unit, predictor, predicting unit) 62 which is connected to the storage unit 32 and the display controller 30. The estimator 62 may be integrally combined with the display controller 30.

The estimator 62 and the display controller 30 are connected to an estimation assistance information output unit (estimation assistance information output means) 60. Based on estimation assistance information output from the estimation assistance information output unit 60, the estimator 62 searches a past operation history, combined with estimation assistance information of the ESC controller 40 (which is called an ESC operation history), stored in the storage unit 32, and estimates the possibility of operation of the ESC controller 40. If the estimator 62 judges that it is highly possible that the ESC controller 40 has operated, then the estimator 62 sends an acceleration range representing the possibility of operation of the ESC controller 40, e.g., an annular range 400 shown in FIG. 10, to the display controller 30.

The acceleration range representing the possibility of operation of the ESC controller 40 varies with the position of the center of gravity of the vehicle 12 and the weight distribution of the vehicle 12, and hence may not necessarily be the annular range 400 shaped as a true circle (circular range), but may be in the shape of an elliptical range, a triangular range, a quadrangular range, or the like, rather than the circular range. In FIG. 10, the annular range 400 is shown as having a certain width. However, the annular range 400 may be shown as a width-free line (annular threshold value, annular pattern).

The estimation assistance information output unit 60 may be a rain sensor 60*a*, a GPS apparatus (apparatus for detecting the position on a map of the vehicle 12) 60*b*, a TPMS (Tire Pressure Monitoring System) 60*c*, or a server 60*d* connected via a communication network, and the like.

If the estimation assistance information output unit 60 is the rain sensor 60*a*, then the estimator 62 predicts that the amount of rain detected by the rain sensor 60*a*, which is mounted on the front windshield etc. of the vehicle 12 is correlated to the μ (coefficient of friction) of the road, and searches the storage unit 32 for a past operation history (coordinates), i.e., an ESC operation history, of the magnitudes Ae11, Ae12, Ae13 and directions of accelerations generated when the ESC controller 40 was operated in the past, which approximate the present output signal from the rain sensor 60*a*.

The estimator 62 estimates that the ESC controller 40 would be operated from the amount of rain detected by the rain sensor 60*a* and the ESC operation history which are stored in association with each other in the storage unit 32. At this time, in order to display the positions (a range of accelerations) where the ESC controller 40 would be operated as an annular range 400 (estimated annular range, predicted annular range) on a screen 53A shown in FIG. 10, the estimator 62 supplies the shape and size of the annular range 400 to the display controller 30.

The display controller 30 then displays the annular range 400 of the supplied shape and size in a color which may be orange to call the user's attention, on the screen 53A.

The screen 53A according to the fourth inventive example does not display thereon the operation history (ESC operation history) of the magnitudes Ae11, Ae12, Ae13 and directions of accelerations generated when the ESC controller 40 was operated in the past.

As shown in FIG. 10, the screen 53A displays thereon the magnitude Ap (present G point) of the acceleration as the present G point 206, the current history Ge, and the annular range 400 of estimated positions where the ESC controller 40 is estimated as would be operated by the estimator 62. From the magnitude Ap, the current history Ge, and the annular range 400 thus displayed, the user can recognize that it is highly possible for the ESC controller 40 to be operated if the magnitude Ap of the acceleration as the present G point 206 becomes as large as the magnitude of the acceleration represented by the annular range 400.

If the estimation assistance information output unit 60 is the GPS apparatus 60*b*, then in view of the fact that a certain area has a road with a low p, the estimator 62 estimates operation of the ESC controller 40 from the information of the present position on the map of the vehicle 12 which is detected by the GPS apparatus 60*b* on the vehicle 12 and the past ESC operation history that is stored in the storage unit 32, and displays the annular range 400 representing the estimated operation of the ESC controller 40.

If the estimation assistance information output unit 60 is the TPMS 60*c*, then the estimator 62 estimates operation of the ESC controller 40 in view of the present tire pressure which is received from the TPMS 60*c* by the display controller 30 and the past ESC operation history, and displays the annular range 400 representing the estimated operation of the ESC controller 40.

If the estimation assistance information output unit 60 uses the server 60*d* that is also connected to other vehicles via the communication network, then the server 60*d* manages the ESC operation history relative to the rain sensor 60*a*, the ESC operation history relative to the GPS apparatus 60*b*, and the ESC operation history relative to the TPMS 60*c* per each vehicle type of other vehicles. Even if there is no ESC operation history for the ESC controller 40 on the vehicle 12 (own vehicle), the estimator 62 and the display controller 30 which function as an other-vehicle information acquirer 64 refer to operating states of other vehicles of the same vehicle type as the vehicle 12 to predict operation of the ESC controller 40 on the vehicle 12 and display the corresponding annular range 400. Using the information about the ESC operation histories of the other vehicles shown in FIG. 9 which have the similar functions to the vehicle 12, it is expected for the estimator 62 to predict operation of the ESC controller 40 with increased accuracy.

The present invention is not limited to the above exemplary embodiments, but may adopt various arrangements based on the contents of the disclosure of the present description. For example, the other-vehicle information acquirer 64 may refer to operating states of the ESC controllers 40 on the other vehicles which are obtained from the estimation assistance information output unit 60, and, if there are no past operating G points 306, 307, 308 (ESC operation history) of the vehicle 12 (own vehicle) in the screen (image) 53 according to the third inventive example (third display mode) described above with reference to FIG. 4, then the screen 53 shown in FIG. 4 may display the ESC operation histories of the other vehicles which are similar to the vehicle 12 of the same type.

Still Another Exemplary Embodiment

Figure 11:
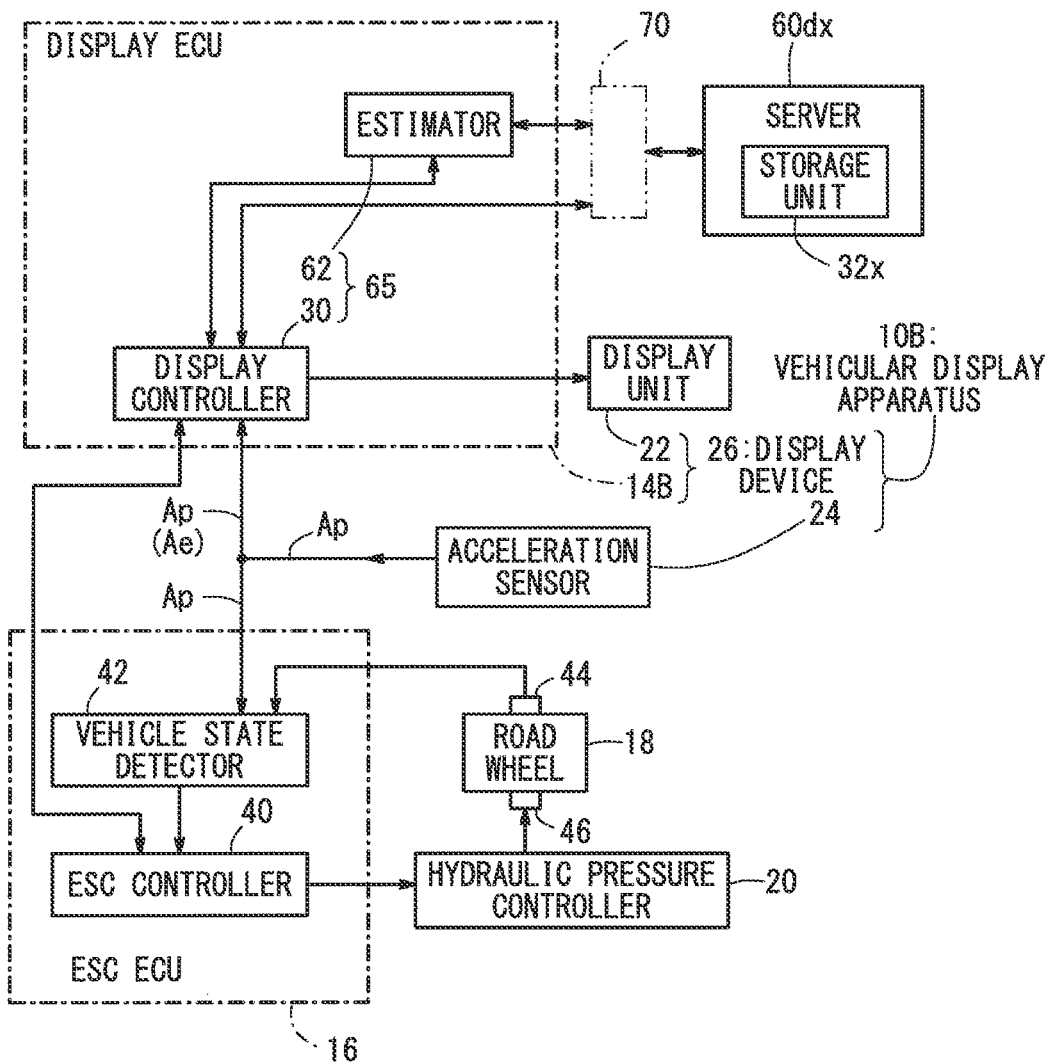
FIG. 11 is a block diagram of a vehicle incorporating a vehicular display apparatus according to still another exemplary embodiment of the present invention.

FIG. 11 is a block diagram of a vehicle incorporating a vehicular display apparatus 10B according to still another exemplary embodiment of the present invention, which is a modification of the vehicular display apparatus 10A shown in FIG. 9 that uses the server 60*dx* connected as the estimation assistance information output unit 60 to other vehicles via the communication network.

As shown in FIG. 11, the vehicular display apparatus 10B has the estimator 62 connected to an external server 60*dx* functioning also as an estimation assistance information output unit. The server 60*dx* manages the ESC operation history relative to the rain sensor 60*a*, the ESC operation history relative to the GPS apparatus 60*b*, and the ESC operation history relative to the TPMS 60*c* per each vehicle type of other vehicles, which are stored in a storage unit 32*x*. The server 60*dx* also manages the ESC operation history relative to the rain sensor 60*a*, the ESC operation history relative to the GPS apparatus 60*b*, and the ESC operation history relative to the TPMS 60*c* of the vehicle 12 (own vehicle), which are stored in the storage unit 32*x*.

The user (driver or the like) brings a mobile terminal 70 such as a smartphone or the like, which is connected to the server 60*dx* via a mobile communication network, not shown, into the vehicle 12. In the vehicle 12, the mobile terminal 70 is connected to a vehicle information acquirer 65 through a wired or wireless link. The vehicle information acquirer 65 is made up of the estimator 62 and the display controller 30.

Each time the ESC controller 40 operates, the operation history of the ESC controller 40 (ESC operation history) of the vehicle 12 is stored in real-time, i.e., immediately, into a RAM as a working volatile memory of a display ECU 14B, and is synchronously stored into the storage unit 32x, i.e., a nonvolatile storage unit, of the server 60dx through the mobile terminal 70.

The estimator 62 in the vehicle 12 searches the operation history (ESC operation history), combined with estimation assistance information, on the vehicle 12 (own vehicle), and the operation history (ESC operation history), combined with estimation assistance information, of the ESC controller 40 on the other vehicles, which are stored in the storage unit 32x of the server 60dx, on the server 60dx through the mobile terminal 70, and estimates the possibility of operation of the vehicle 12 (own vehicle) when the vehicle 12 is in a present state, i.e., in a present environment. If the estimator 62 judges that it is highly possible for the ECS controller 40 to be operated as a skid prevention controller (skid prevention control unit), then the estimator 62 supplies the range of accelerations representing the possibility of operation of the ESC controller 40, e.g., the annular range 400 shown in FIG. 10, to the display controller 30.

The display controller 30 then displays the corresponding annular range 400 on the screen 53A as shown in FIG. 10.

The estimator 62 may be present in the server 60dx, rather than the vehicle 12. Regardless of whether the estimator 62 is present in the vehicle 12 or not, the display controller 30 of the vehicular display apparatus 10B shown in FIG. 11 is not required to have a nonvolatile memory (storage unit), but may display the screen 53A (FIG. 10), the screen 51 (FIG. 2), the screen 52 (FIG. 3), and the screen 53 (FIG. 4) on the display unit 22, based on the operation history stored in the storage unit 32x of the server 60dx.

What is claimed is:

1. A vehicle, comprising:
    an acceleration sensor for detecting an acceleration generated on the vehicle;
    a skid prevention controller for detecting skidding of a road wheel on a road and generating a braking force on the road wheel to prevent the road wheel from skidding; and
    a vehicular display apparatus for displaying an acceleration generated on the vehicle, the vehicular display apparatus having
    a display device for simultaneously displaying both: a magnitude of the acceleration which is currently being detected by the acceleration sensor, as a current magnitude of the acceleration; and
    a magnitude of an acceleration detected by the acceleration sensor at a past time when the skid prevention controller generated the braking force on the road wheel, as a discrete quantity of a past magnitude of the acceleration,
    wherein the display device individually displays the current magnitude of the acceleration and the discrete quantity of the past magnitude of the acceleration.

2. The vehicle according to claim 1, wherein the vehicular display apparatus further comprises:
    a storage unit for storing the discrete quantity of the past magnitude of the acceleration;
    wherein the discrete quantity of the past magnitude of the acceleration is a magnitude of an acceleration to be detected by the acceleration sensor when the skid prevention controller is to generate the braking force on the road wheel.

3. The vehicle according to claim 2, wherein the storage unit is provided in at least one of the vehicle and an external server.

4. The vehicle according to claim 1, wherein the display device simultaneously displays both:
    the current magnitude of the acceleration on a prescribed scale; and
    the discrete quantity of the past magnitude of the acceleration on the prescribed scale.

5. The vehicle according to claim 4, wherein the vehicular display apparatus further comprises:
    a storage unit for storing the discrete quantity of the past magnitude of the acceleration;
    wherein the display device displays a prescribed number of data of the discrete quantity of the past magnitude of the acceleration stored in the storage unit on the prescribed scale.

6. The vehicle according to claim 5, wherein the display device simultaneously displays both:
    the current magnitude of the acceleration and a direction of the acceleration which is currently detected by the acceleration sensor on the prescribed scale; and
    the discrete quantity of the past magnitude of the acceleration and a direction of the acceleration detected by the acceleration sensor at the past time when the skid prevention controller generated the braking force on the road wheel on the prescribed scale.

7. The vehicle according to claim 2, wherein the vehicular display apparatus further comprises:
    an other-vehicle information acquirer for acquiring a magnitude of an acceleration detected by an acceleration sensor of another vehicle and stored in a storage unit of the other vehicle when a skid prevention controller of the other vehicle generated a braking force on a road wheel of the other vehicle, and the display device displays the magnitude of the acceleration acquired by the other-vehicle information acquirer.

8. The vehicle according to claim 1, wherein the current magnitude of the acceleration is displayed by the display device in a first area of a display screen of the display device, while the past magnitude of the acceleration is simultaneously displayed in a second area of the display screen of the display device, wherein at least a portion of the first area does not overlap the second area on the display screen.

9. The vehicle according to claim 8, wherein an entirety of the first area does not overlap the second area on the display screen.

10. The vehicle according to claim 1, wherein the display device is configured to communicate with the skid prevention controller to receive an input when the skid prevention controller generates the braking force on the road wheel, and wherein the input is received by the display device each time the skid prevention controller generates the braking force on the road wheel, and the discrete quantity of the past magnitude of the acceleration is updated each time the input is received by the display device when the skid prevention controller generated the braking force on the road wheel.

11. The vehicle according to claim 10, wherein the current magnitude of the acceleration and the discrete quantity of the past magnitude of the acceleration detected are displayed continuously by the display device.

12. A vehicle, comprising:
    an acceleration sensor for detecting an acceleration generated on the vehicle;
    a skid prevention controller for detecting skidding of a road wheel on a road and generating a braking force on the road wheel to prevent the road wheel from skidding; and a vehicular display apparatus for displaying an acceleration generated on the vehicle, the vehicular display apparatus having a display device for displaying a magnitude of the acceleration which is being detected by the acceleration sensor;

wherein the display device is configured to communicate with the skid prevention controller to receive an input when the skid prevention controller generates the braking force on the road wheel, the display device simultaneously displays both:

the magnitude of the acceleration which is being detected by the acceleration sensor; and a magnitude of an acceleration detected by the acceleration sensor at a time when the input is received by the display device when the skid prevention controller generated the braking force on the road wheel, wherein the magnitude of the acceleration which is being detected by the acceleration sensor is displayed by the display device in a first area of a display screen of the display device, while the magnitude of the acceleration detected by the acceleration sensor at the time when the input is received by the display device when the skid prevention controller generated the braking force on the road wheel is simultaneously displayed in a second area of the display screen of the display device, and wherein at least a portion of the first area does not overlap the second area on the display screen.

13. The vehicle according to claim 12, wherein the vehicular display apparatus further comprises:

a storage unit for storing the magnitude of the acceleration detected by the acceleration sensor when the skid prevention controller generated the braking force on the road wheel;

wherein the magnitude of the acceleration detected by the acceleration sensor at the time when the input is received by the display device when the skid prevention controller generated the braking force on the road wheel is a magnitude of an acceleration to be detected by the acceleration sensor when the skid prevention controller is to generate the braking force on the road wheel.

14. The vehicle according to claim 13, wherein the storage unit is provided in at least one of the vehicle and an external server.

15. The vehicle according to claim 12, wherein the display device simultaneously displays both:

the magnitude of the acceleration which is being detected by the acceleration sensor on a prescribed scale; and the magnitude of the acceleration detected by the acceleration sensor at the time when the input is received by the display device when the skid prevention controller generated the braking force on the road wheel on the prescribed scale.

16. The vehicle according to claim 15, wherein the display device further comprises:

a storage unit for storing the magnitude of the acceleration detected by the acceleration sensor at the time when the input is received by the display device when the skid prevention controller generated the braking force on the road wheel;

wherein the display device displays a prescribed number of data of the magnitude of the acceleration stored in the storage unit on the prescribed scale.

17. The vehicle according to claim 16, wherein the display device simultaneously displays both:

the magnitude and a direction of the acceleration which are being detected by the acceleration sensor on the prescribed scale; and the magnitude and a direction of the acceleration detected by the acceleration sensor at the time when the input is received by the display device when the skid prevention controller generated the braking force on the road wheel on the prescribed scale.

18. The vehicle according to claim 13, wherein the vehicular display apparatus further comprises:

an other-vehicle information acquirer for acquiring a magnitude of an acceleration detected by an acceleration sensor of another vehicle and stored in a storage unit of the other vehicle when a skid prevention controller of the other vehicle generated a braking force on a road wheel of the other vehicle, and the display device displays the magnitude of the acceleration acquired by the other-vehicle information acquirer.

19. The vehicle according to claim 12, wherein the magnitude of the acceleration which is being detected by the acceleration sensor and the magnitude of the acceleration detected by the acceleration sensor at the time when the input is received by the display device when the skid prevention controller generated the braking force on the road wheel are displayed simultaneously and separately by the display device.

20. The vehicle according to claim 12, wherein an entirety of the first area does not overlap the second area on the display screen.

21. The vehicle according to claim 15, wherein the magnitude of the acceleration which is being detected by the acceleration sensor and the magnitude of the acceleration detected by the acceleration sensor at the time when the input is received by the display device when the skid prevention controller generated the braking force on the road wheel are displayed simultaneously and separately on the prescribed scale by the display device.

22. The vehicle according to claim 12, wherein the input is received by the display device each time the skid prevention controller generates the braking force on the road wheel, and the magnitude of the acceleration detected by the acceleration sensor at the time when the input is received by the display device when the skid prevention controller generated the braking force on the road wheel is updated each time the input is received by the display device when the skid prevention controller generated the braking force on the road wheel.

23. The vehicle according to claim 22, wherein the magnitude of the acceleration which is being detected by the acceleration sensor and the magnitude of the acceleration detected by the acceleration sensor at the time when the input is received by the display device when the skid prevention controller generated the braking force on the road wheel are displayed continuously by the display device.

24. A vehicle, comprising:

an acceleration sensor for detecting an acceleration generated on the vehicle;

a skid prevention controller for detecting skidding of a road wheel on a road and generating a braking force on the road wheel to prevent the road wheel from skidding; and a vehicular display apparatus for displaying an acceleration generated on the vehicle, the vehicular display apparatus having a display device for displaying a magnitude of the acceleration which is being detected by the acceleration sensor;

wherein the display device is configured to communicate with the skid prevention controller to receive an input when the skid prevention controller generates the braking force on the road wheel,
the display device simultaneously displays both:
the magnitude of the acceleration which is being detected by the acceleration sensor; and
a magnitude of an acceleration detected by the acceleration sensor at a time when the input is received by the display device when the skid prevention controller generated the braking force on the road wheel, and
wherein the input is received by the display device each time the skid prevention controller generates the braking force on the road wheel, and
the magnitude of the acceleration detected by the acceleration sensor at the time when the input is received by the display device when the skid prevention controller generated the braking force on the road wheel is updated each time the input is received by the display device when the skid prevention controller generated the braking force on the road wheel.

25. The vehicle according to claim 24, wherein the vehicular display apparatus further comprises:
a storage unit for storing the magnitude of the acceleration detected by the acceleration sensor when the skid prevention controller generated the braking force on the road wheel;
wherein the magnitude of the acceleration detected by the acceleration sensor at the time when the input is received by the display device when the skid prevention controller generated the braking force on the road wheel is a magnitude of an acceleration to be detected by the acceleration sensor when the skid prevention controller is to generate the braking force on the road wheel.

26. The vehicle according to claim 25, wherein the storage unit is provided in at least one of the vehicle and an external server.

27. The vehicle according to claim 24, wherein the display device simultaneously displays both:
the magnitude of the acceleration which is being detected by the acceleration sensor on a prescribed scale; and
the magnitude of the acceleration detected by the acceleration sensor at the time when the input is received by the display device when the skid prevention controller generated the braking force on the road wheel on the prescribed scale.

28. The vehicle according to claim 27, wherein the vehicular display apparatus further comprises:
a storage unit for storing the magnitude of the acceleration detected by the acceleration sensor at the time when the input is received by the display device when the skid prevention controller generated the braking force on the road wheel;
wherein the display device displays a prescribed number of data of the magnitude of the acceleration stored in the storage unit on the prescribed scale.

29. The vehicle according to claim 28, wherein the display device simultaneously displays both:
the magnitude and a direction of the acceleration which are being detected by the acceleration sensor on the prescribed scale; and
the magnitude and a direction of the acceleration detected by the acceleration sensor at the time when the input is received by the display device when the skid prevention controller generated the braking force on the road wheel on the prescribed scale.

30. The vehicle according to claim 25, wherein the vehicular display apparatus further comprises:
an other-vehicle information acquirer for acquiring a magnitude of an acceleration detected by an acceleration sensor of another vehicle and stored in a storage unit of the other vehicle when a skid prevention controller of the other vehicle generated a braking force on a road wheel of the other vehicle, and the display device displays the magnitude of the acceleration acquired by the other-vehicle information acquirer.

31. The vehicle according to claim 24, wherein the magnitude of the acceleration which is being detected by the acceleration sensor and the magnitude of the acceleration detected by the acceleration sensor at the time when the input is received by the display device when the skid prevention controller generated the braking force on the road wheel are displayed simultaneously and separately by the display device.

32. The vehicle according to claim 24, wherein the magnitude of the acceleration which is being detected by the acceleration sensor is displayed by the display device in a first area of a display screen of the display device, while the magnitude of the acceleration detected by the acceleration sensor at the time when the input is received by the display device when the skid prevention controller generated the braking force on the road wheel is simultaneously displayed in a second area of the display screen of the display device, wherein at least a portion of the first area does not overlap the second area on the display screen.

33. The vehicle according to claim 32, wherein an entirety of the first area does not overlap the second area on the display screen.

34. The vehicle according to claim 27, wherein the magnitude of the acceleration which is being detected by the acceleration sensor and the magnitude of the acceleration detected by the acceleration sensor at the time when the input is received by the display device when the skid prevention controller generated the braking force on the road wheel are displayed simultaneously and separately on the prescribed scale by the display device.

35. The vehicle according to claim 24, wherein the magnitude of the acceleration which is being detected by the acceleration sensor and the magnitude of the acceleration detected by the acceleration sensor at the time when the input is received by the display device when the skid prevention controller generated the braking force on the road wheel are displayed continuously by the display device.

* * * * *